US012809202B2

(12) United States Patent
Hung et al.

(10) Patent No.: US 12,809,202 B2
(45) Date of Patent: Nov. 24, 2026

(54) DISPLAY DEVICE AND ASSEMBLING METHOD THEREOF

(71) Applicant: AmTRAN TECHNOLOGY Co., Ltd., New Taipei City (TW)

(72) Inventors: Chih-Chien Hung, New Taipei City (TW); Po-Hsiang Wang, New Taipei City (TW); Hsien-Kai Lin, New Taipei City (TW)

(73) Assignee: AmTRAN TECHNOLOGY Co., Ltd., New Taipei City (TW)

( * ) Notice: Subject to any disclaimer, the term of this patent is extended or adjusted under 35 U.S.C. 154(b) by 123 days.

(21) Appl. No.: 19/082,052

(22) Filed: Mar. 17, 2025

(65) Prior Publication Data

US 2026/0023279 A1 Jan. 22, 2026

(30) Foreign Application Priority Data

Jul. 22, 2024 (TW) ................................ 113127368

(51) Int. Cl.
*G02F 1/1333* (2006.01)

(52) U.S. Cl.
CPC .. *G02F 1/133325* (2021.01); *G02F 1/133314* (2021.01); *G02F 1/133317* (2021.01); *G02F 1/13332* (2021.01); *G02F 1/13338* (2013.01)

(58) Field of Classification Search
CPC ......... G02F 1/133308; G02F 1/133317; G02F 1/133314; G02F 1/13332; G02F 1/133325
USPC ........................................................... 349/56
See application file for complete search history.

(56) References Cited

U.S. PATENT DOCUMENTS

| | | | | |
|---|---|---|---|---|
| 2010/0039578 | A1 | 2/2010 | Roh et al. | |
| 2023/0039947 | A1 | 2/2023 | Ye et al. | |
| 2024/0184325 | A1* | 6/2024 | Wang | G02F 1/1333 |
| 2024/0272671 | A1* | 8/2024 | Wang | G06F 1/1637 |

FOREIGN PATENT DOCUMENTS

| | | | | |
|---|---|---|---|---|
| CN | 213024348 | | 4/2021 | |
| CN | 113759611 A | * | 12/2021 | G02F 1/1339 |
| CN | 217787546 U | * | 11/2022 | |
| CN | 219574538 | | 8/2023 | |
| CN | 118072610 | | 5/2024 | |
| TW | 201250339 | | 12/2012 | |

OTHER PUBLICATIONS

"Office Action of Taiwan Counterpart Application", issued on Oct. 30, 2025, p. 1-p. 4.

* cited by examiner

*Primary Examiner* — Christopher M Raabe
(74) *Attorney, Agent, or Firm* — JCIPRNET

(57) ABSTRACT

A display device includes a front cover, a positioning member, a buffering member, a display panel, a frame, a backlight film, and a back plate. The positioning member is fixed to the front cover. The buffering member is in contact with the positioning member. A panel edge of the display panel is close to but not in contact with the buffering member. The frame is attached and fixed to the display panel and is in contact with the buffering member and the positioning member. The backlight film is attached and fixed to the frame. The back plate is fixed to the frame and leans against the backlight film. A back plate sidewall of the back plate is positioned between the frame and the positioning member. An assembling method of the display device is also provided.

20 Claims, 13 Drawing Sheets

DISPLAY DEVICE AND ASSEMBLING METHOD THEREOF

CROSS-REFERENCE TO RELATED APPLICATION

This application claims the priority benefit of Taiwan application serial no. 113127368, filed on Jul. 22, 2024. The entirety of the above-mentioned patent application is hereby incorporated by reference herein and made a part of specification.

BACKGROUND

Technical Field

The disclosure relates to a display technology, and in particular, to a display device and an assembling method thereof.

Description of Related Art

In common display devices, the cover panels are attached and fixed to the front covers by an adhesive layer or an adhesive tape, and the display panels are attached and fixed to the cover panels by an adhesive layer or an adhesive tape. On the other hand, the frames are attached and fixed to the cover panels and the display panels by an adhesive layer or an adhesive tape. Considering assembly tolerance, a gap is left between the edges of the display panels and the frames. During the process of moving or flipping the display devices, the display panels may slide relative to the cover panel and the frame and be out of position due to insufficient bonding area or bonding force of the adhesive layer or the adhesive tape, and even collide with the frame and be damaged. Recently, the demand for large-scale rotatable display devices has been growing. Due to the large sizes and heavy weights of the display panels in these large-scale display devices, the problem of the display panels slipping and being damaged is particularly evident.

SUMMARY

The disclosure provides a display device and an assembling method thereof capable of improving product reliability.

The disclosure provides a display device including a front cover, a plurality of positioning members, a plurality of buffering members, a display panel, a frame, a backlight film, and a back plate. The front cover forms a positioning space. Each of the plurality of positioning members includes a positioning portion and a connecting portion, and the positioning portion and the connecting portion are disposed in the positioning space. The plurality of buffering members are disposed at positions in the positioning space contacting the plurality of positioning portions of the plurality of positioning members, and the display panel is disposed in the positioning space. The plurality of buffering members are located between the display panel and the plurality of positioning portions, and a panel edge of the display panel is close to but not in contact with the plurality of buffering members. The frame is disposed in the positioning space and fixed to the display panel. The frame includes a platform portion and an abutting portion. A first surface of the platform portion is fixed to the plurality of buffering members and the display panel, and the abutting portion contacts the positioning portion of each of the plurality of positioning members. The backlight film is attached and fixed to a second surface of the platform portion, and the second surface is opposite to the first surface. The back plate leans against the backlight film and an end point of a sidewall of the frame.

In an embodiment of the disclosure, the display device further includes a cover panel. The cover panel is fixed to a first positioning surface of the front cover, and an edge of the cover panel is close to but not in contact with a second positioning surface of the front cover. The first positioning surface and the second positioning surface define the positioning space.

In an embodiment of the disclosure, a back plate sidewall of the back plate is disposed between the sidewall of the frame and the connecting portion, and a gap is provided between the back plate sidewall and the connecting portion.

In an embodiment of the disclosure, the connecting portion further includes a positioning protrusion. The positioning protrusion protrudes toward the sidewall of the frame, and the gap is provided between the back plate sidewall of the back plate and the positioning protrusion of the connecting portion.

In an embodiment of the disclosure, the frame further includes a positioning groove formed between the platform portion and the abutting portion, and the abutting portion is aligned to a back surface on the positioning portion of each of the plurality of positioning members.

In an embodiment of the disclosure, the positioning portion of each of the plurality of positioning members is bent to form a positioning sidewall, and the positioning groove of the frame is aligned with the positioning sidewall.

In an embodiment of the disclosure, the display device further includes an optical touch module and a filter plate. The optical touch module is disposed in an installation chamber of the front cover, and the installation chamber has an opening adjacent to the first positioning surface. The filter plate is installed in the opening.

The disclosure further provides a display device including a front cover, a positioning member, a buffering member, a display panel, a frame, a backlight film, and a back plate. The positioning member is fixed to the front cover. The buffering member is in contact with the positioning member. A panel edge of the display panel is close to but not in contact with the buffering member. The frame is attached and fixed to the display panel and is in contact with the buffering member and the positioning member. The backlight film is attached and fixed to the frame. The back plate is fixed to the frame and leans against the backlight film. A back plate sidewall of the back plate is positioned between the frame and the positioning member.

In an embodiment of the disclosure, the display device further includes a cover panel. The cover panel is fixed to the front cover, and a gap is provided in a horizontal direction between an edge of the cover panel and the front cover.

In an embodiment of the disclosure, a gap is provided in a horizontal direction between the back plate sidewall of the back plate and the positioning member.

In an embodiment of the disclosure, the positioning member includes a positioning protrusion protruding toward the frame. A gap is provided in the horizontal direction between the back plate sidewall of the back plate and the positioning protrusion.

In embodiment of the disclosure, a positioning space is formed inside the front cover. The cover panel fixed to a first positioning surface of the front cover, the edge of the cover panel is close to but not in contact with a second positioning surface of the front cover, and the first positioning surface and the second positioning surface define the positioning space.

In embodiment of the disclosure, the display device further includes an optical touch module and a filter plate. The optical touch module is disposed in an installation chamber of the front cover, and the installation chamber has an opening adjacent to the first positioning surface. The filter plate is installed in the opening.

In embodiment of the disclosure, the frame includes a platform portion, an abutting portion, and a positioning groove formed between the platform portion and the abutting portion. The abutting portion is aligned to a back surface of the positioning member.

In embodiment of the disclosure, the positioning member includes a positioning sidewall, and the positioning groove of the frame is aligned with the positioning sidewall.

The disclosure further provides an assembling method of a display device including a front cover, a display panel, and a back plate. The assembling method includes the following steps. The front cover is placed in a vertical direction. A positioning space is formed inside the front cover. A plurality of positioning members are arranged. Each of the plurality of positioning members includes a positioning portion and a connecting portion, and the positioning portion and the connecting portion are disposed in the positioning space. A plurality of buffering members are arranged. The plurality of buffering members are disposed at positions in the positioning space contacting the plurality of positioning portions of the plurality of positioning members. The display panel is arranged in the positioning space. A panel edge of the display panel is close to but not in contact with the plurality of buffering members. The plurality of buffering members are located between the display panel and the plurality of positioning portions. A frame is arranged in the positioning space and is fixed to the display panel. The frame includes a platform portion and an abutting portion. A first surface of the platform portion is fixed to the plurality of buffering members and the display panel, and the abutting portion contacts the positioning portion of each of the plurality of positioning members. A backlight film is arranged on a second surface of the platform portion. The second surface is opposite to the first surface. The back plate is arranged to lean against the backlight film and an end point of a sidewall of the frame.

In an embodiment of the disclosure, the assembling method further includes the step of disposing and fixing a cover panel on a first positioning surface of the front cover. An edge of the cover panel is close to but not in contact with a second positioning surface of the front cover, and the first positioning surface and the second positioning surface define the positioning space.

In an embodiment of the disclosure, the step of arranging the back plate to lean against the backlight film and the end point of the sidewall of the frame further includes a sub-step of disposing a back plate sidewall of the back plate between the sidewall of the frame and the connecting portion and leaving a gap between the back plate sidewall and the connecting portion.

In an embodiment of the disclosure, the connecting portion further includes a positioning protrusion, and the gap is left between the back plate sidewall of the back plate and the positioning protrusion of the connecting portion.

In an embodiment of the disclosure, the assembling method further includes the steps of disposing an optical touch module in an installation chamber of the front cover and installing a filter plate in the opening of the installation chamber. The installation chamber has an opening adjacent to the first positioning surface.

To sum up, in the display device and the assembling method thereof provided by the disclosure, the buffering member separates the panel edge of the display panel from the positioning member. The panel edge of the display panel faces the buffering member in the horizontal direction, and the panel edge is close to but not in contact with the buffering member. Therefore, during the process of transporting or flipping the display device, the buffering member is able to prevent the display panel from excessively sliding and is also able to prevent the display panel from colliding with the positioning member or other adjacent structures, so that the reliability of the product is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
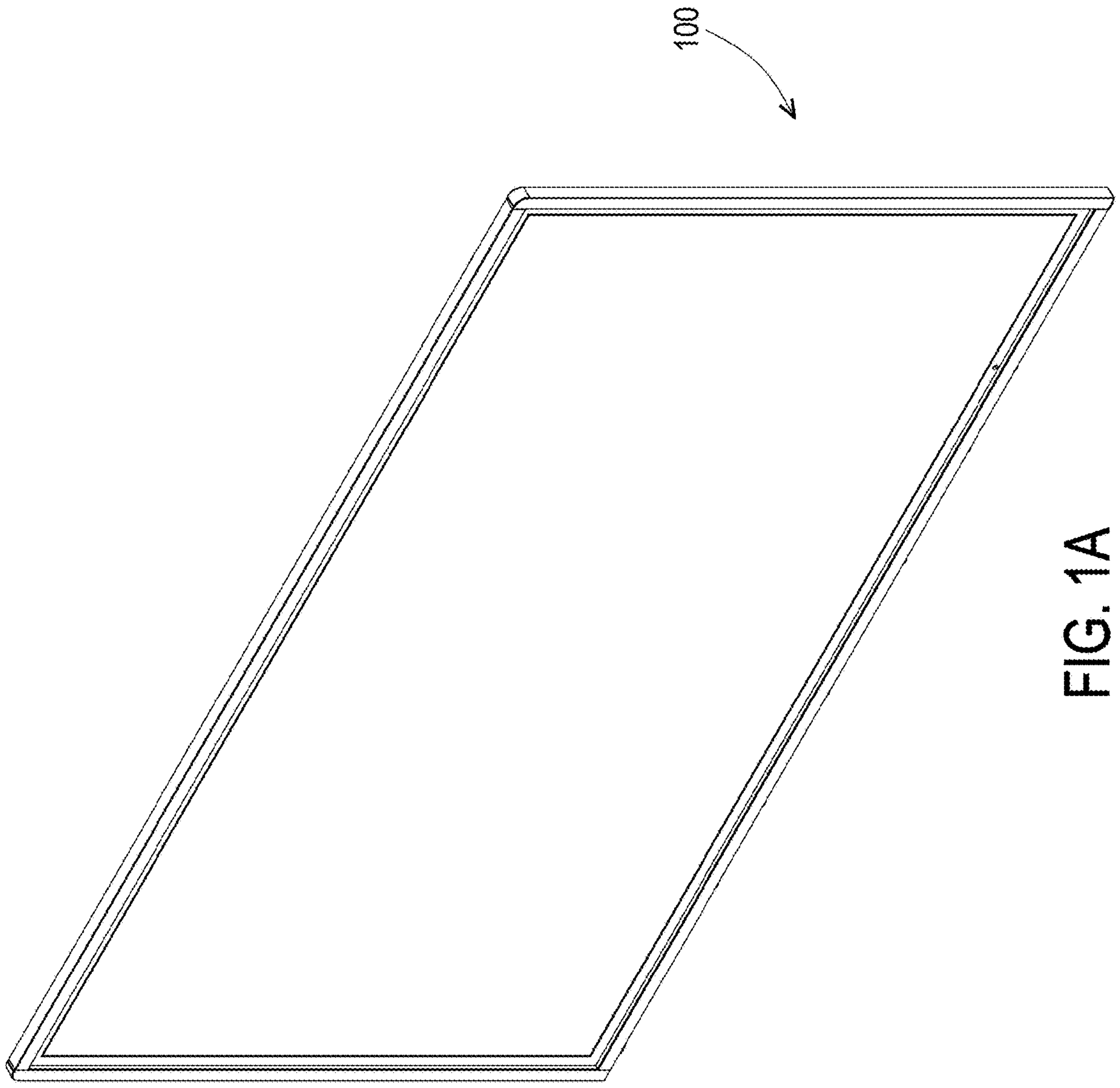
FIG. 1A is a schematic view of a display device according to an embodiment of the disclosure.
Figure 1B:
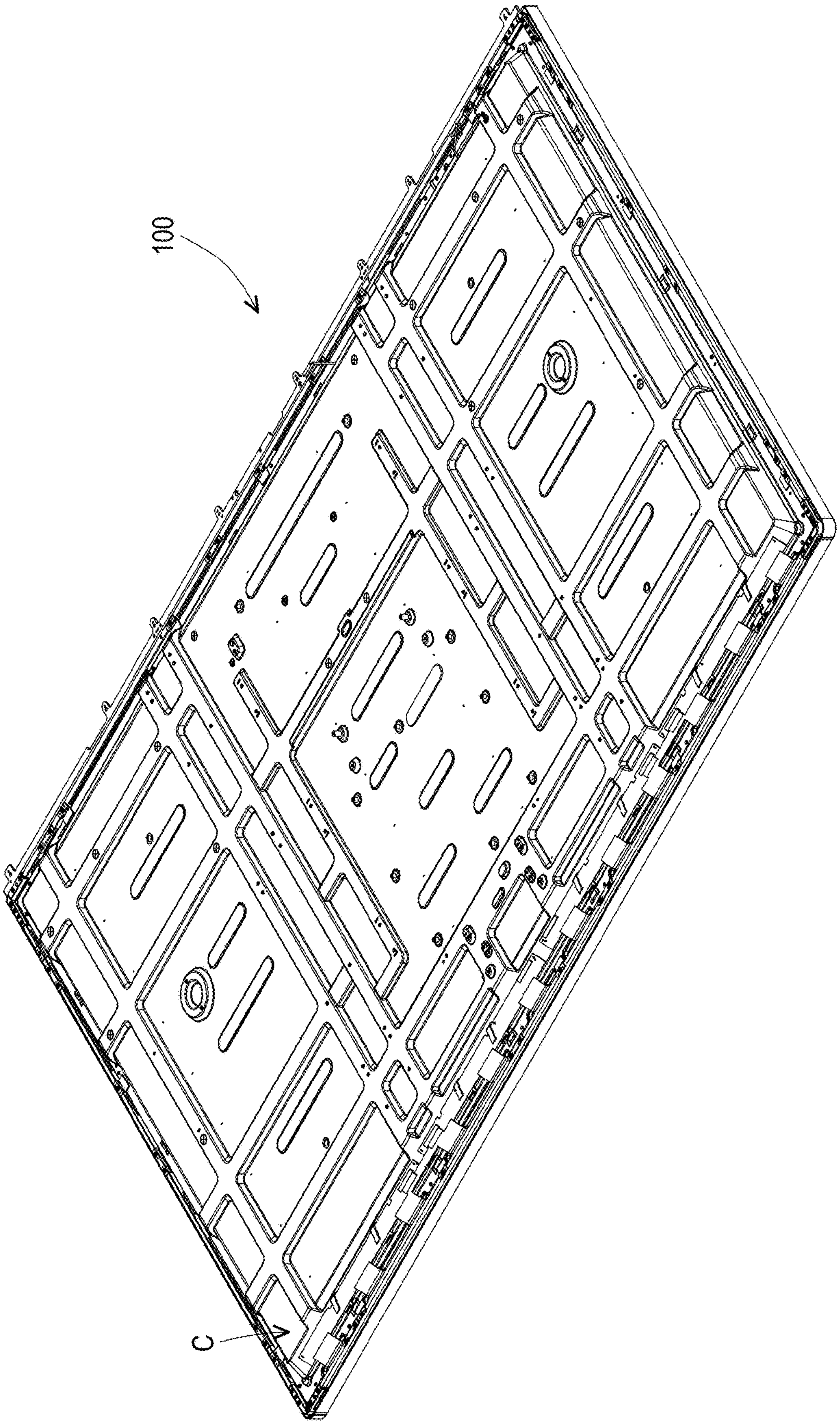
FIG. 1B is a schematic rear view of the display device with a back plate removed according to an embodiment of the disclosure.

Please refer to FIG. 1A and FIG. 1B. FIG. 1A is a schematic view of a display device according to an embodiment of the disclosure, and FIG. 1B is a schematic rear view of the display device with a back plate removed according to an embodiment of the disclosure. In an embodiment, a display device 100 may be a large-scale display device and optionally implement optical touch technology. On the other hand, the display device 100 may be installed on a rotating stand, allowing a user to flip or rotate it at a large angle depending on operation needs, such as clockwise or counterclockwise rotation to switch between portrait and landscape display modes, or to flipping forward and backward to transition from a vertical state to a horizontal state or to another side, so as to facilitate user operation or viewing.

Figure 1C:
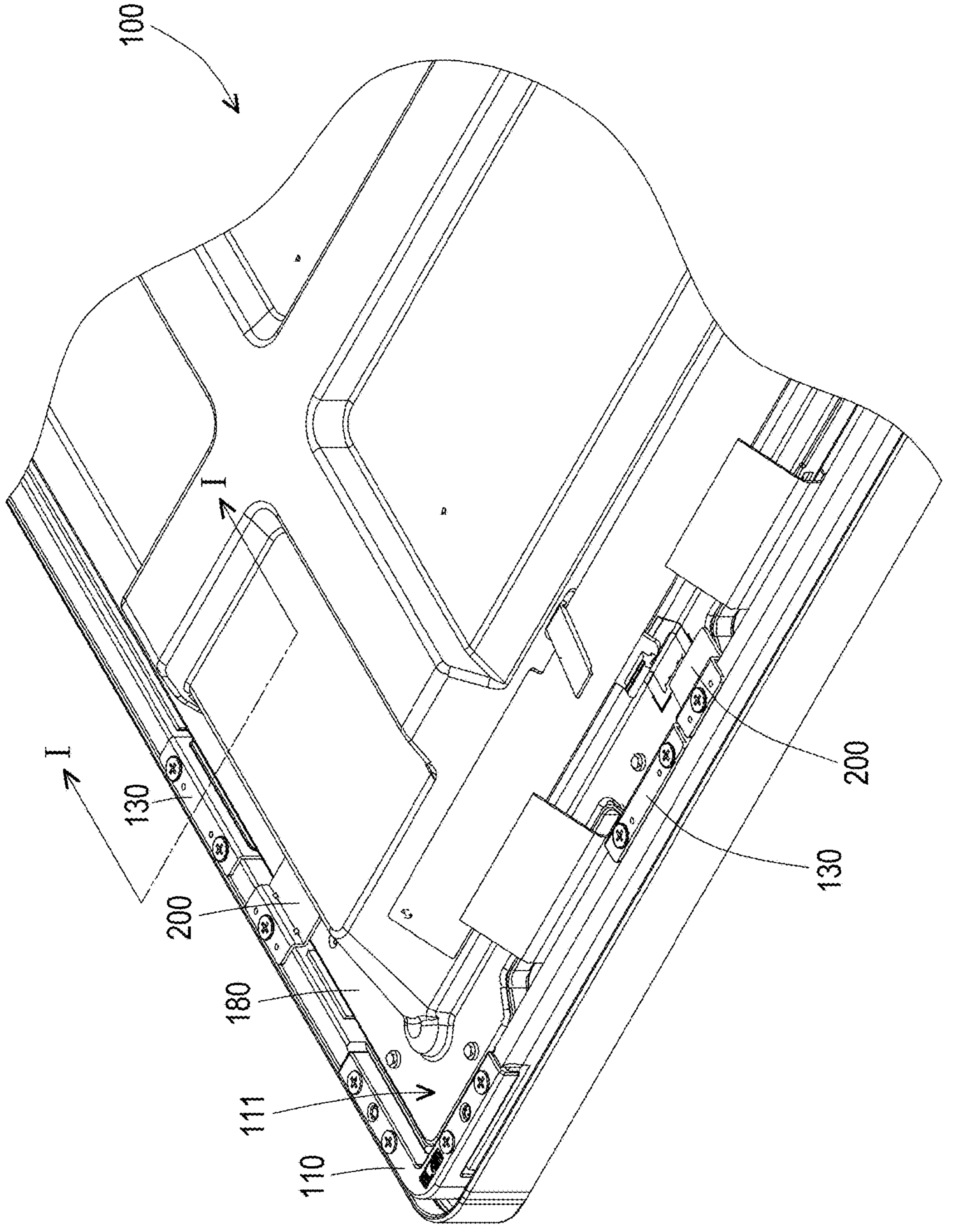
FIG. 1C is a partial enlarged schematic view of a portion C of the display device of FIG. 1B.
Figure 1D:
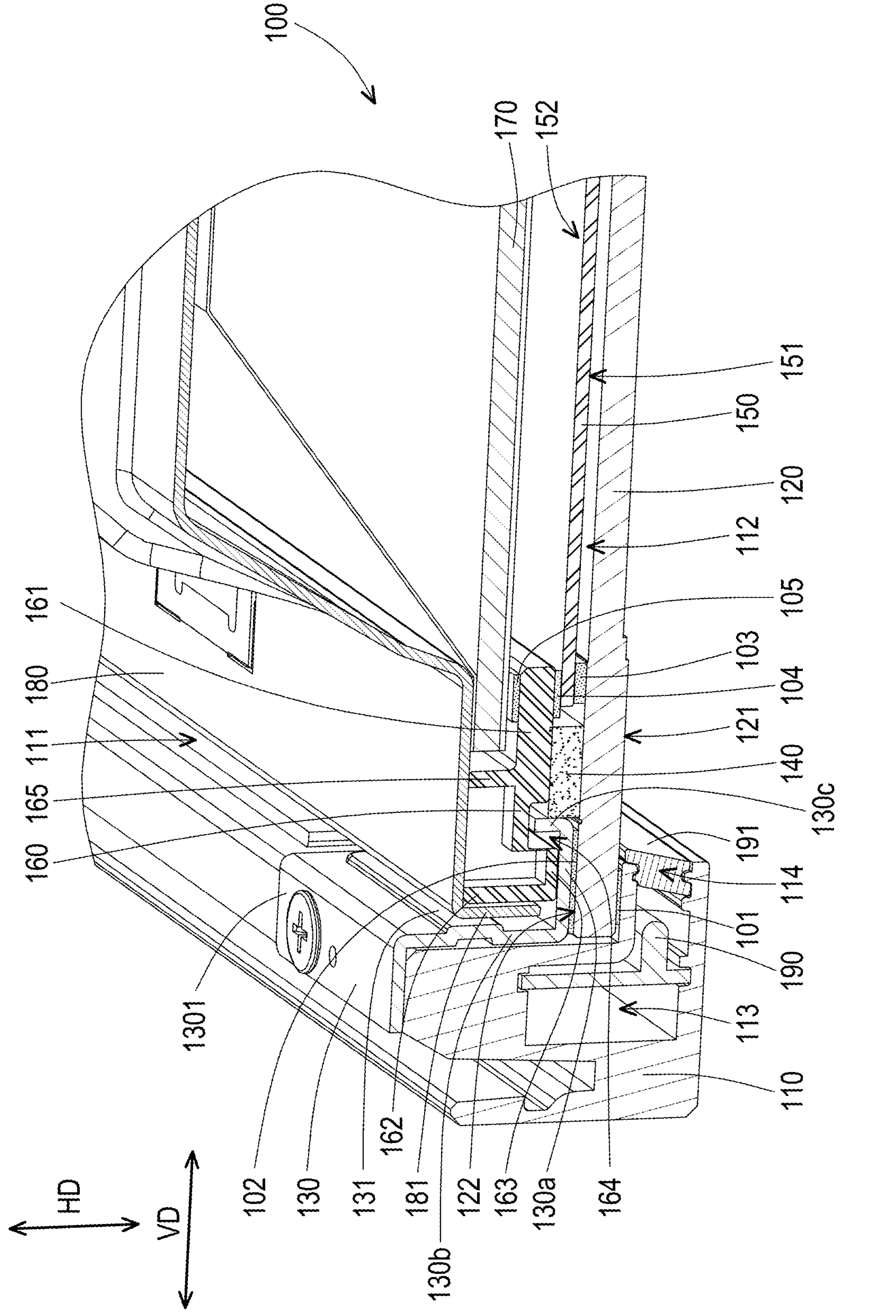
FIG. 1D is a partial three-dimensional cross-sectional schematic view taken along a cut-line I-I in FIG. 1C showing a side portion of the display device.

FIG. 1C is a partial enlarged schematic view of a portion C of the display device in FIG. 1B. FIG. 1D is a partial three-dimensional cross-sectional schematic view taken along a cut-line I-I in FIG. 1C showing a side portion of the display device. Please refer to FIGS. 1B through 1D. In one embodiment, the display device 100 includes a front cover 110, a cover panel 120, a positioning member 130, a buffering member 140, a display panel 150, a frame 160, a backlight film 170, and a back plate 180. The cover panel 120 may be a transparent or light-transmitting cover panel, and the cover panel 120 has a touch surface 121 and a back surface 122 opposite to each other.

Specifically, the touch surface 121 is attached and fixed to the front frame 110 in the vertical direction VD through an adhesive layer 101 around the periphery or partial edge position of the touch surface 121. In addition, a gap is left between the edge of the cover panel 120 and the front cover 110 in the horizontal direction HD. In this way, the cover panel 120 is allowed to be placed into the front cover 110 in the vertical direction VD during the assembly process, and collision or interference between them can be avoided during assembly. However, the disclosure is not limited thereto. In other embodiments, the cover panel 120 may be removed or integrated with the display panel 150. In some embodiments, the cover panel 120 and the display panel 150 may be curved.

In some embodiments, a plurality of positioning members 130 are disposed around the internal periphery of the front cover 110. Each positioning member 130 includes a planar positioning portion 130*a*, a planar locking portion 1301, and a connecting portion 130*b* connecting the two. In addition, the positioning portion 130*a*, the locking portion 1301, and the connecting portion 130*b* of each positioning member 130 are integrally formed in one piece. The locking portion 1301 is at an outer side of the positioning member 130 in the horizontal direction HD, and the locking portion 1301 is locked and fixed to the front cover 110 in the vertical direction VD. In contrast, the positioning portion 130*a* is at an inner side of the positioning member 130 in the horizontal direction HD, and the positioning portion 130*a* is attached and fixed to a periphery or a portion of the periphery of the back surface 122 of the cover panel 120 in the vertical direction VD through an adhesive layer 102.

In some embodiments, a positioning space 111 is formed inside the front cover 110 to accommodate the cover panel 120, the plurality of positioning members 130, the buffering member 140, the display panel 150, the frame 160, the backlight film 170, and the back plate 180. In addition, the positioning portion 130*a* and the connecting portion 130*b* of each positioning member 130 are disposed in the positioning space 111, such as around the periphery or at a portion of the periphery of the positioning space 111.

In some embodiments, the buffering member 140 is disposed on the back surface 122 of the cover panel 120. During assembly, the buffering member 140 may be attached to the back surface 122 in the vertical direction VD through an adhesive layer (not shown), and the position where the buffering member 140 is attached can be accurately positioned by the positioning portion 130*a* of the positioning member 130. In some embodiments, the positioning portion 130*a* is bent to form a positioning sidewall 130*c*, and the buffering member 140 contacts the positioning sidewall 130*c* as the position for attaching the buffering member 140 to the back surface 122.

The buffering member 140 may be made of rubber, foam, or other elastically deformable materials that can absorb impact forces. There may be a plurality of buffering members 140, and each of the buffering members 140 may be paired with one corresponding positioning members 130 to define the installation region 112 of the display panel 150 within the positioning space 111. In other words, the plurality of buffering members 140 are respectively disposed at positions within the positioning space 111 where each of the buffering members 140 can contact the positioning portion 130*a* of the corresponding positioning member 130. In some embodiments, the number of the buffering members may differ from the number of the positioning members, for example, a one-to-many or many-to-one configuration may be adopted, or different configurations may be adopted on different sides. The shapes or sizes of the buffering members and the positioning members may also be changed according to practical requirements.

Please refer to FIG. 1C and FIG. 1D. In some embodiments, the display panel 150 may be a liquid crystal panel attached and fixed to the back surface 122 of the cover panel 120 via an adhesive layer 103. Specifically, during assembly, the display panel 150 may be positioned by the plurality of buffering members 140 and the plurality of positioning members 130, so as to be accurately placed in the installation region 112 in the vertical direction VD and attached and fixed to the back surface 122 of the cover panel 120.

In some embodiments, a panel edge of the display panel 150 is close to but not in contact with the plurality of buffering members 140 in the horizontal direction HD. In other words, in the horizontal direction HD, the panel edge of the display panel 150 is directed towards the plurality of buffering members 140 but a gap is left therebetween. In this way, when the display panel 150 is placed into the installation region 112 in the vertical direction VD, collision or interference that may damage the display panel 150 can be effectively avoided. For instance, the plurality of buffering members 140 are disposed around the installation region 112, and one or more buffering members 140 may be disposed on any side of the installation region 112 to define the assembly position of the display panel 150 and provide protection during assembly.

In some embodiments, the frame 160 includes a platform portion 161 formed at inner side in the horizontal direction HD, and the platform portion 161 has a first surface facing the cover panel 120. During assembly, the first surface of the platform portion 161 is attached and fixed to the display panel 150 in the vertical direction VD through an adhesive layer 104, and the first surface also contacts the buffering members 140 or is attached and fixed to the buffering members 140 in the vertical direction VD. In addition, the frame 160 includes an outer sidewall 162, an abutting portion 163, and a positioning groove 164 formed at outer side in the horizontal direction HD, and the positioning groove 163 is formed between the platform portion 161 and the abutting portion 163. During assembly, the abutting portion 163 is aligned to a back surface on the positioning portion 130*a* of each positioning member 130 and abuts against or contacts with the back surface of the positioning portion 130*a* in the vertical direction VD. The positioning groove 164 is aligned with and accommodates the positioning sidewall 130*c* of the positioning member 130.

On the other hand, the adhesive layer 103 and the adhesive layer 104 are respectively attached to a first surface 151 of the display panel 150 and a second surface 152 opposite to the first surface 151, where the first surface 151 faces the cover panel 120. In the vertical direction VD, the display panel 150 is clamped and fixed between the platform portion 161 of the frame 160 and the cover panel 120. The buffering members 140 are also clamped and fixed between the platform portion 161 of the frame 160 and the cover panel 120. Further, in the horizontal direction HD, the buffering members 140 are located between the display panel 150 and the positioning portions 130*a* of the corresponding positioning members 130. Therefore, when the display device 100 is transported or flipped, the buffering members 140 can not only prevent the display panel 150 from excessively sliding but also protect the display panel 150 from colliding with other adjacent structures, such as preventing the display panel 150 from colliding with the positioning members 130, thereby enhancing the product's reliability.

Please refer to FIG. 1D. The backlight film 170 is attached and fixed to the second surface, which is opposite to the first surface, on the platform portion 161 of the frame 160 through an adhesive layer 105 in the vertical direction VD. In addition, a frame inner sidewall 165 is formed on the second surface of the platform portion 161 of the frame 160 to locate the installation position of the backlight film 170. In addition, the back plate 180 leans against the end point of the frame outer sidewall 162 and the frame inner sidewall 165, and the back plate 180 presses against the backlight film 170. Specifically, in the vertical direction VD, the backlight film 170 is clamped and fixed between the back plate 180 and the second surface of the platform portion 161 of the frame 160, and the platform portion 161 of the frame 160 is clamped and fixed between the backlight film 170 and the display panel 150. In some embodiments, the platform portion 161, the frame outer sidewall 162, the abutting portion 163, the positioning groove 164, and the frame inner sidewall 165 are an integrally formed in one piece.

On the other hand, the back plate 180 leans against the end point of the frame outer sidewall 162 and the frame inner sidewall 165, and the frame inner sidewall 165 is formed at the position on the second surface of the platform portion 161 which is opposite to where the buffering member 140 is attached to the first surface. In this way, the platform portion 161 of the frame 160 is clamped and fixed between the back plate 180 and the buffering members 140. In addition, the abutting portion 163 of the frame 160 abuts against the back surface of the positioning portion 130*a* of each positioning member 130, and the abutting portion 163 is connected to the frame outer sidewall 162. Therefore, the frame 160 is also clamped and fixed between the back plate 180 and the positioning portion 130*a* of each positioning member 130.

On the other hand, in the horizontal direction HD, an assembly gap is left between the outermost of the frame outer sidewall 162 of the frame 160 and the connecting portion 130*b* of each positioning member 130. In some embodiments, the back plate 180 is a metal cover having a plurality of bent structures. The outermost side of the back plate 180 in the horizontal direction HD is bent to form a back plate sidewall 181 extending in the vertical direction VD, and the back plate sidewall 181 and the back plate 180 are integrally formed in one piece. During assembly, the back plate sidewall 181 may be inserted into the aforementioned assembly gap in the vertical direction VD to be positioned between the frame outer sidewall 162 of the frame 160 and the connecting portion 130*b* of the positioning member 130.

Specifically, the connecting portion 130*b* of each positioning member 130 includes a positioning protrusion 131, where the positioning protrusion 131 extends in the horizontal direction HD toward the frame outer sidewall 162 of the frame 160 but does not contact the outermost of the back plate sidewall 181 of the back plate 180. Further, the back plate sidewall 181 does not abut against or contact the positioning portion 130*a* of each positioning member 130 in the vertical direction VD. That is, in the horizontal direction HD, a gap is left between the back plate sidewall 181 and the connecting portion 130*b* of each positioning member 130 as well as and the positioning protrusion 131 thereon.

In addition, the positioning protrusion 131 of each positioning member 130 and the frame outer sidewall 162 may accurately position the back plate sidewall 181 of the back plate 180. In the design of a conventional display device, because the assembly position is obscured by the back plate during assembly in the vertical direction VD, the back cover is prone to misalignment. Therefore, it is necessary to flip the conventional display device to change the assembly direction during assembly. However, the display device 100 of the present disclosure can avoid such problem and skip the steps of flipping display device and reversing the assembly direction during assembly.

FIG. 2A to FIG. 2H are partial cross-sectional schematic views showing the display device of FIG. 1D during assembling process at another viewing angle. The assembling process of the display device 100 is described in the following paragraphs. First, please refer to FIG. 2A, the front cover 110 is placed toward the vertical direction VD. Specifically, the front cover 110 has a first positioning surface 110*a*, a second positioning surface 110*b*, and a third positioning surface 110*c*, where the second positioning surface 110*b* is connected between the first positioning surface 110*a* and the third positioning surface 110*c*, and the positioning space 111 is substantially defined by the connected first positioning surface 110*a* and the second positioning surface 110*b*. For instance, the first positioning surface 110*a* and the third positioning surface 110*c* are parallel to each other, and the second positioning surface 110*b* is perpendicular to the first positioning surface 110*a* and the third positioning surface 110*c*.

Figure 2A:
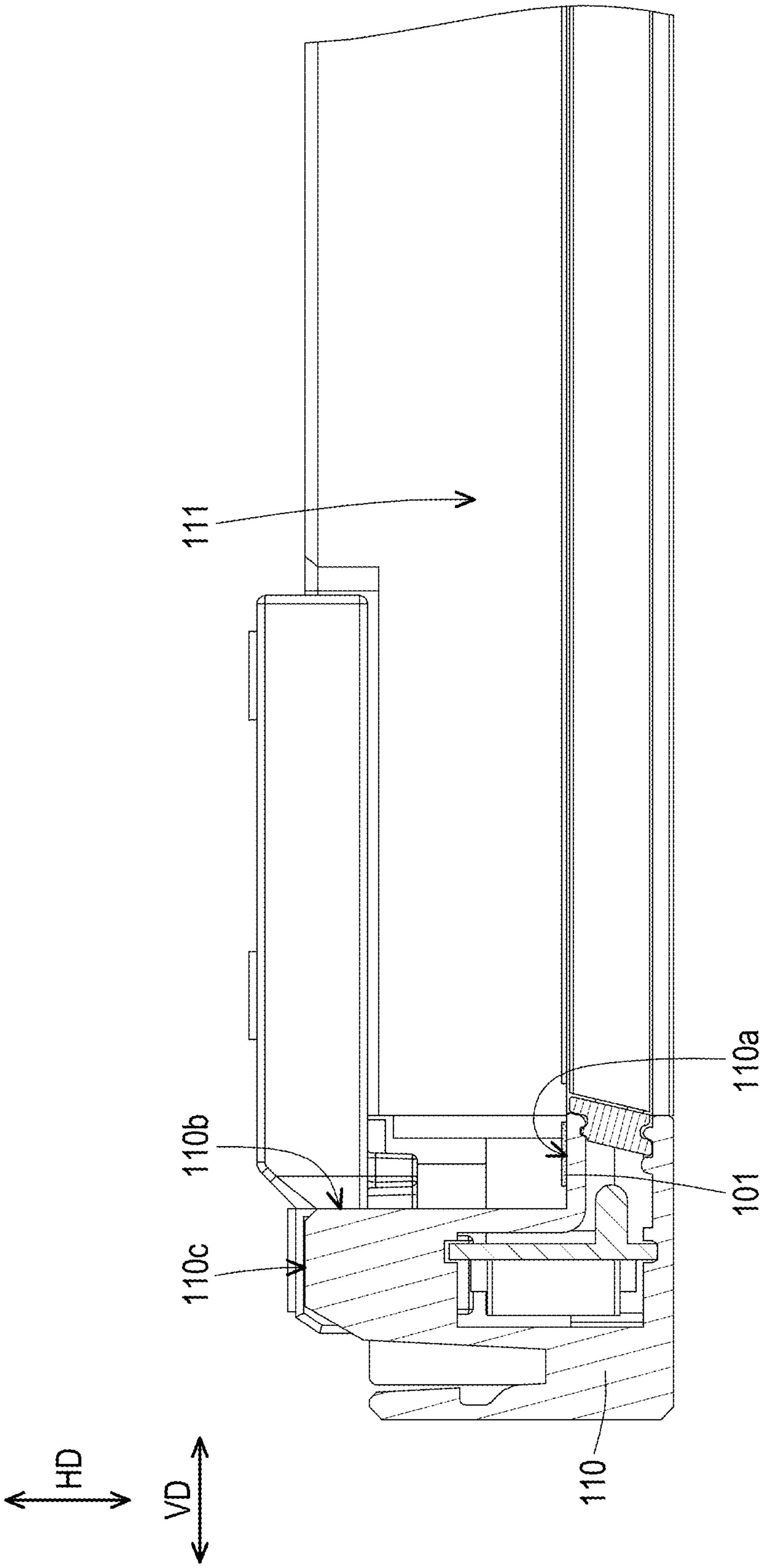
FIG. 2A to FIG. 2H are partial cross-sectional schematic views showing the display device of FIG. 1D during assembling process at another viewing angle.
Figure 2B:
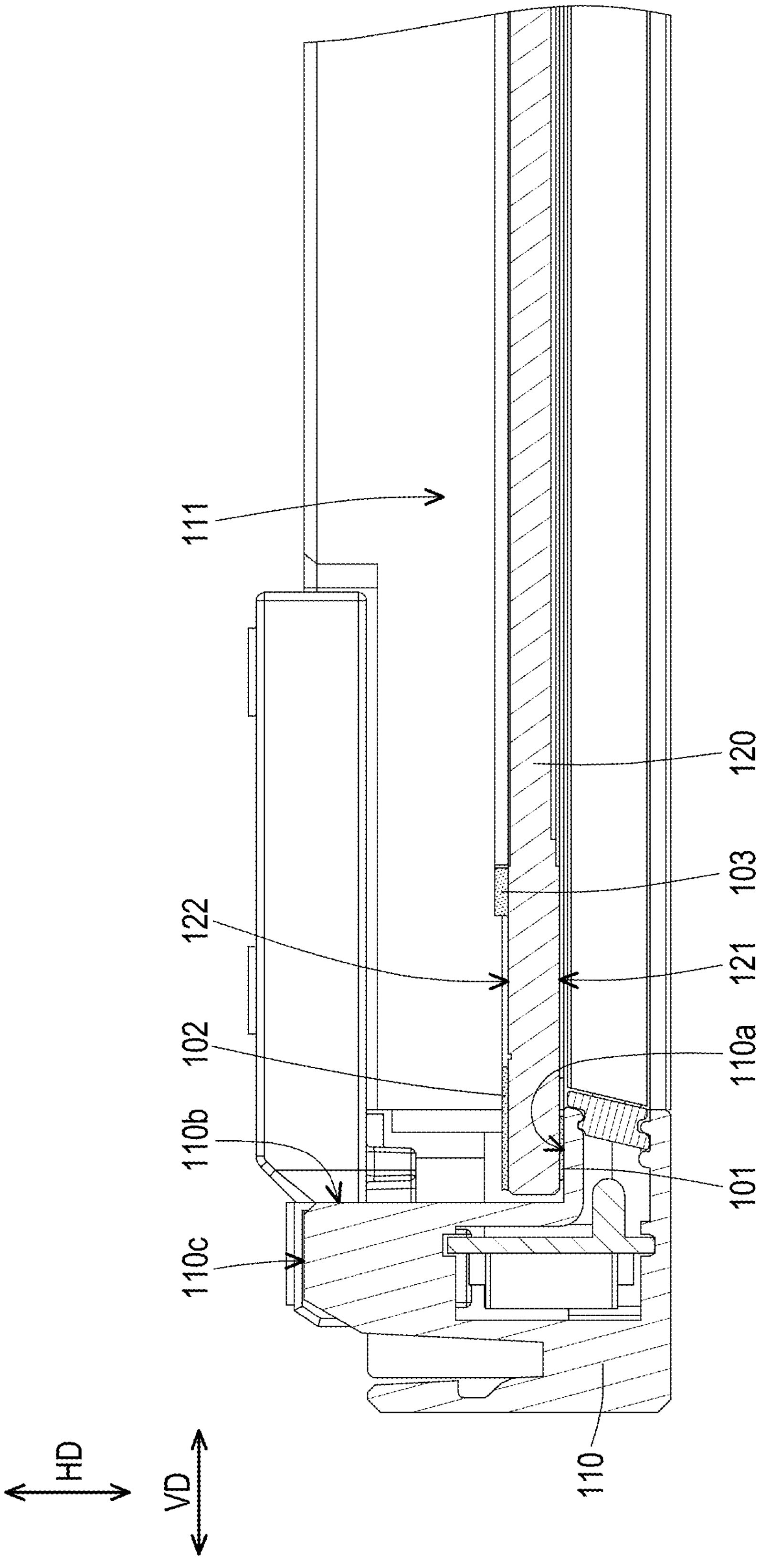

Next, please refer to FIG. 2A and FIG. 2B, the adhesive layer 101 is disposed on the first positioning surface 110*a*. The touch surface 121 of the cover panel 120 is first directed toward the first positioning surface 110*a*, and then the cover panel 120 is placed into the positioning space 111 the vertical direction VD, such that the cover panel 120 is attached and fixed to the first positioning surface 110*a* through the adhesive layer 101. In addition, the edge of the cover panel 120 is oriented toward the second positioning surface 110*b* in the horizontal direction HD, and a gap is left between the cover panel 120 and the second positioning surface 110*b* to avoid collision or interference during assembly. That is, the edge of the cover panel 120 is close to but not in contact with a second positioning surface 110*b* of the front cover 110.

Figure 2C:
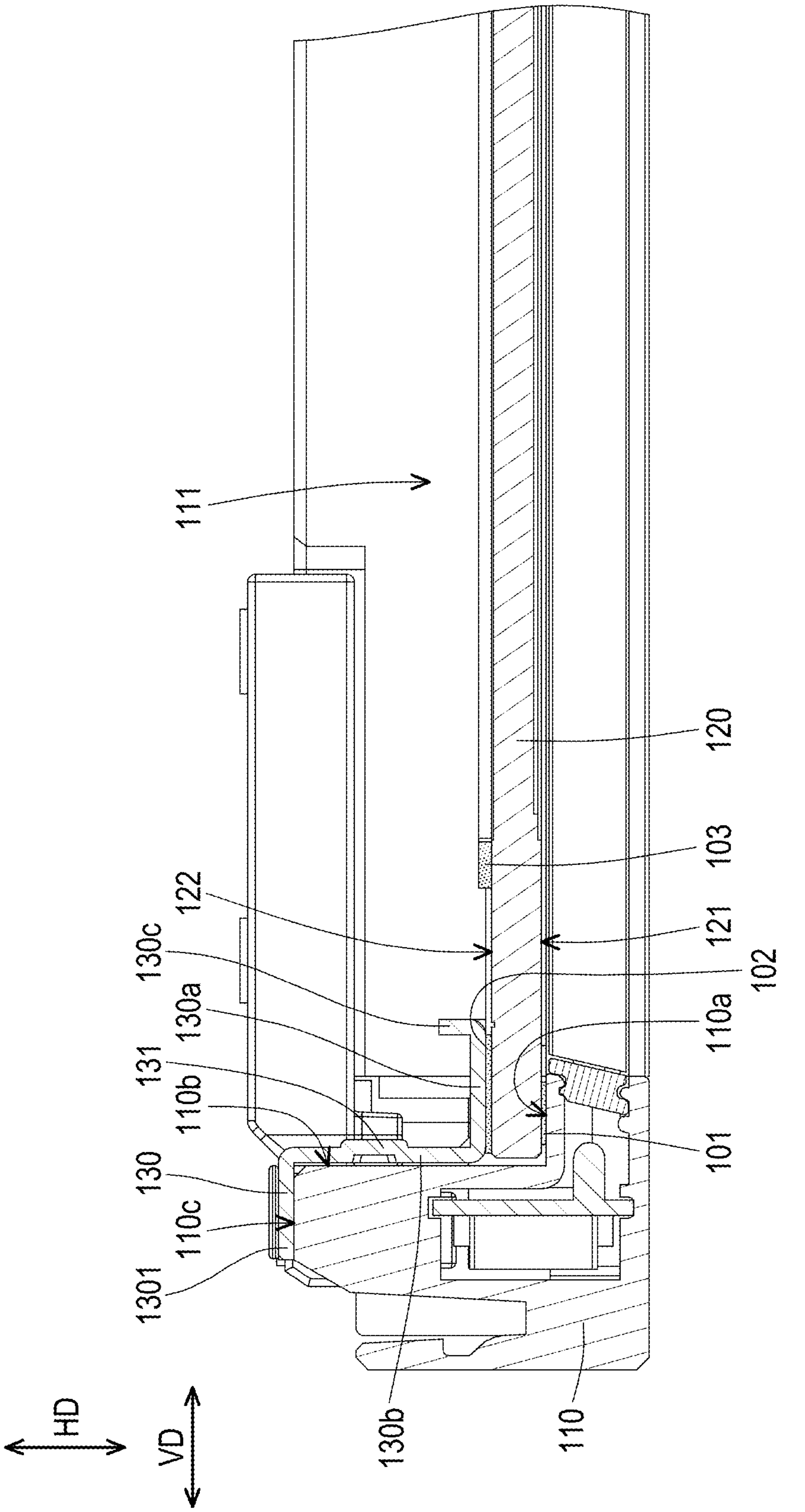

Next, please refer to FIG. 2B and FIG. 2C, the back surface 122 of the cover panel 120 is provided with the adhesive layer 102 and the adhesive layer 103, where the adhesive layer 102 is disposed between the second positioning surface 110*b* and the adhesive layer 103. Please refer to FIG. 1C, FIG. 1D, and FIG. 2C, a plurality of positioning members 130 are disposed, and each positioning member 130 may be locked and fixed to the third positioning surface 110*c* by a screw. Specifically, each positioning member 130 includes the connected positioning portion 130*a* and the connecting portion 130*b*. The positioning portions 130*a* and the connecting portions 130*b* are placed within the positioning space 111. Specifically, the positioning portions 130*a* are disposed corresponding to the first positioning surface 110*a* and may be parallel to the first positioning surface 110*a*. The positioning portion 130*a* is attached and fixed to the back surface 122 of the cover panel 120 in the vertical direction VD through the adhesive layer 102, so that the cover panel 120 is positioned between the positioning portion 130*a* and the first positioning surface 110*a*. In addition, the connecting portion 130*b* is disposed corresponding to the second positioning surface 110*b* and may be parallel to the second positioning surface 110*b*.

Figure 2D:
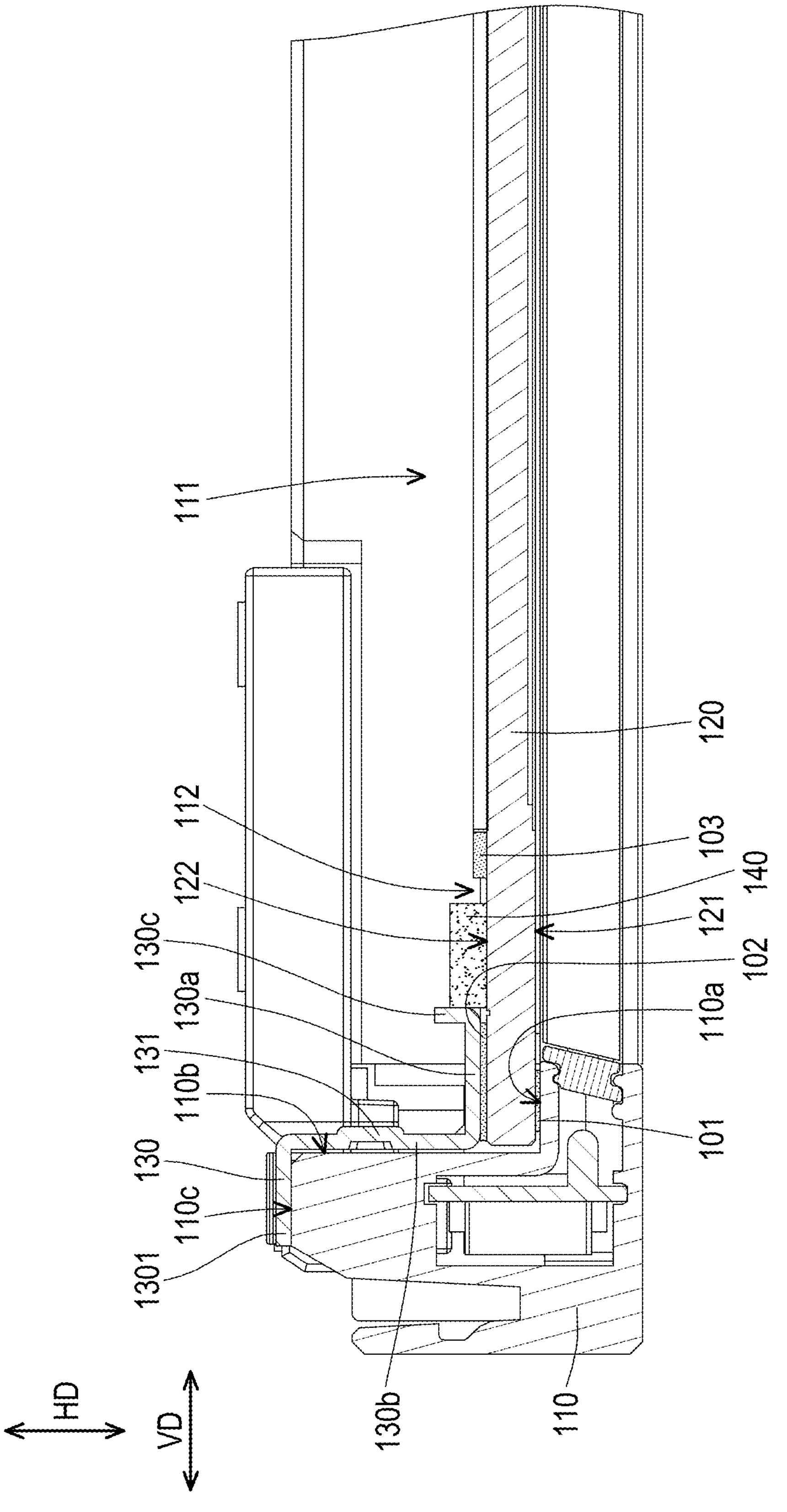

Next, please refer to FIG. 2C and FIG. 2D, the positioning portion 130*a* has the positioning sidewall 130*c* extending away from the connecting portion 130*b*, for example, the positioning sidewall 130c protruding in the vertical direction VD from an end of the positioning portion 130a, which is away from the connecting portion 130b. As shown in FIG. 1C, FIG. 1D, and FIG. 2D, a plurality of buffering members 140 are arranged, where the plurality of buffering members 140 are placed within the positioning space 111 at positions contacting the plurality of positioning portions 130a of the plurality of positioning members 130. Specifically, each buffering member 140 is attached and fixed to the back surface 122, which is opposite to the touch surface 121, and contacts the positioning sidewall 130c of the positioning portion 130a. On the other hand, each buffering member 140 is located between the adhesive layer 102 and the adhesive layer 103. For instance, the plurality of buffering members 140 and the plurality of positioning members 130 are arranged in one-to-one configuration to define the installation region 112 of the display panel 150 within the positioning space 111.

Figure 2E:
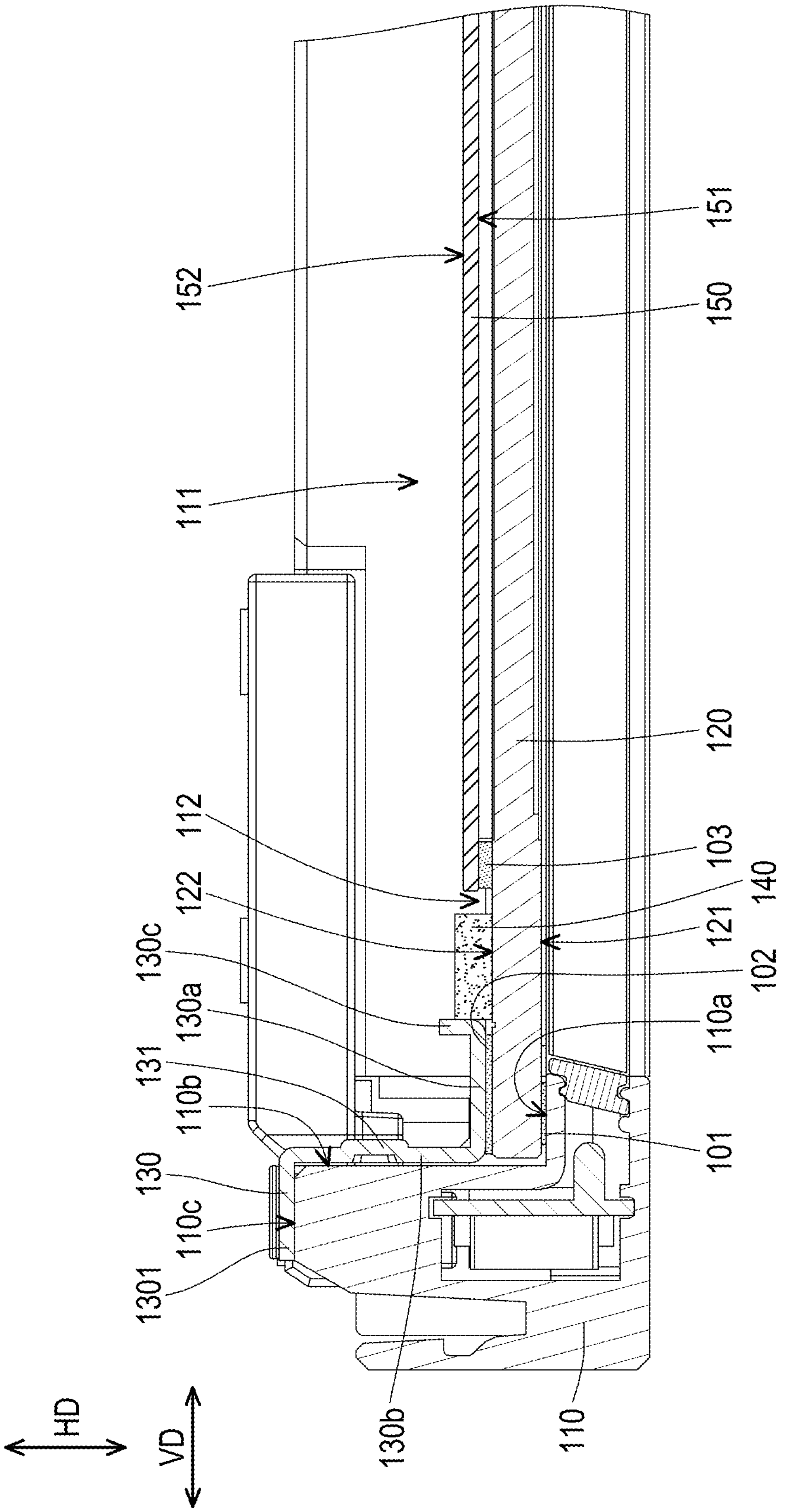

Next, please refer to FIG. 2D and FIG. 2E, the display panel 150 is placed into the positioning space 111 and installed in the installation region 112 in the vertical direction VD, so that the first surface 151 of the display panel 150 is attached and fixed to the back surface 122 of the cover panel 120 through the adhesive layer 103. Specifically, in the horizontal direction HD, the panel edge of the display panel 150 is close to but not in contact with each buffering member 140. In this way, when the display panel 150 is installed in the installation region 112 in the vertical direction VD, collision or interference that may damage the display panel 150 can be effectively avoided. In addition, in the horizontal direction HD, each buffering member 140 is located between the display panel 150 and the positioning portion 130a of the corresponding positioning member 130.

Figure 2F:
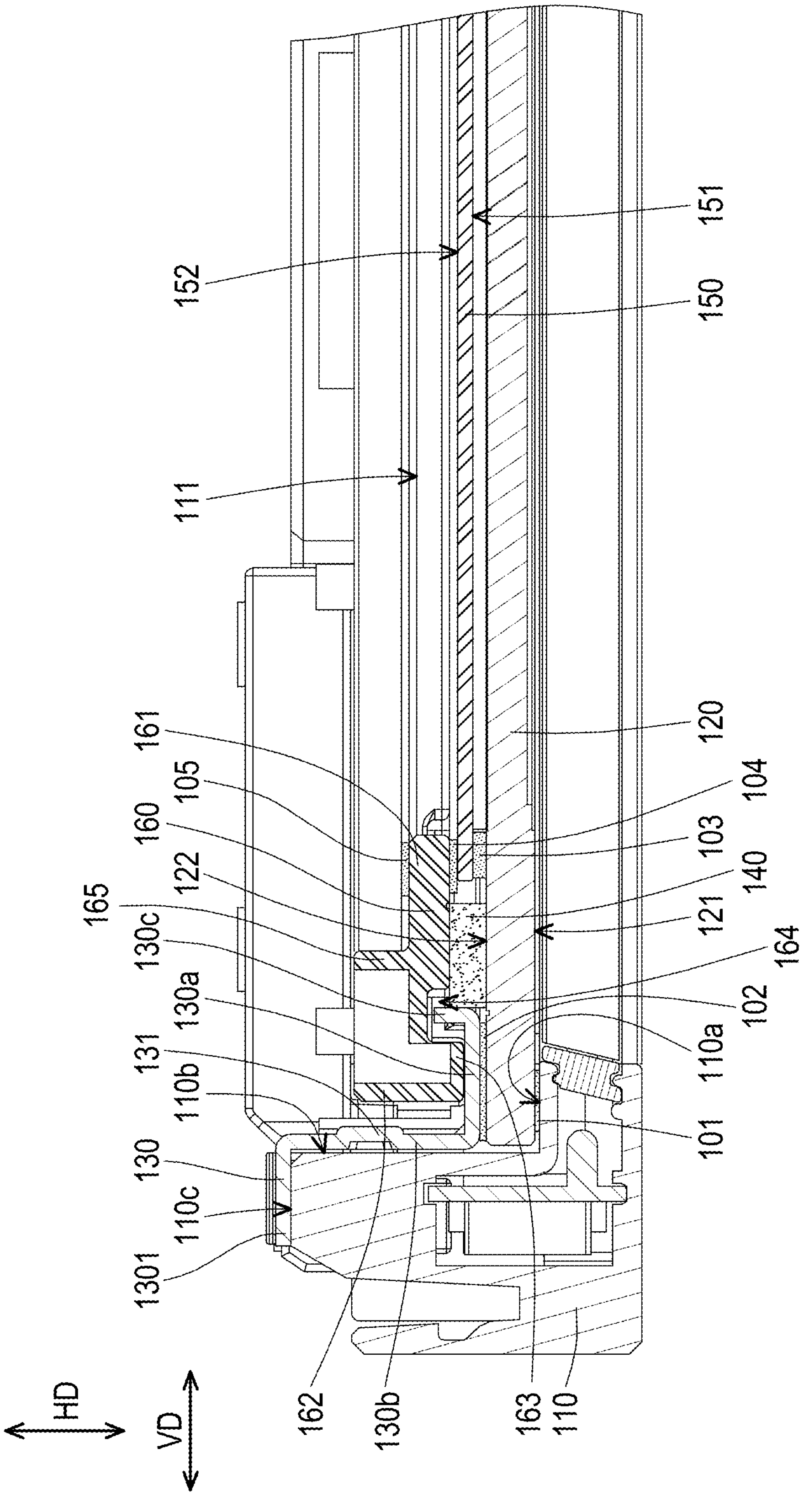

Next, please refer to FIG. 2E and FIG. 2F, the adhesive layer 104 is disposed around the periphery or at a portion of the periphery of the second surface 152 of the display panel 150. The frame 160 is then placed within the positioning space 111 in the vertical direction VD, such that the abutting portion 163 of the frame 160 is inserted between the connecting portion 130b and the positioning sidewall 130c and in contact with the positioning portion 130a in the vertical direction VD. However, the abutting portion 163 and the frame outer sidewall 162 of the frame 160 do not contact the connecting portion 130b in the horizontal direction HD, so that an assembly gap is left therebetween. Furthermore, the positioning groove 164 of the frame 160 is aligned with the positioning sidewall 130c but an assembly gap is also provided therebetween, so that collision or interference can be avoided. In addition, the first surface of the platform portion 161 of the frame 160 contacts or is fixed to the buffering members 140 and is attached and fixed to the second surface 152 of the display panel 150 through the adhesive layer 104.

Figure 2G:
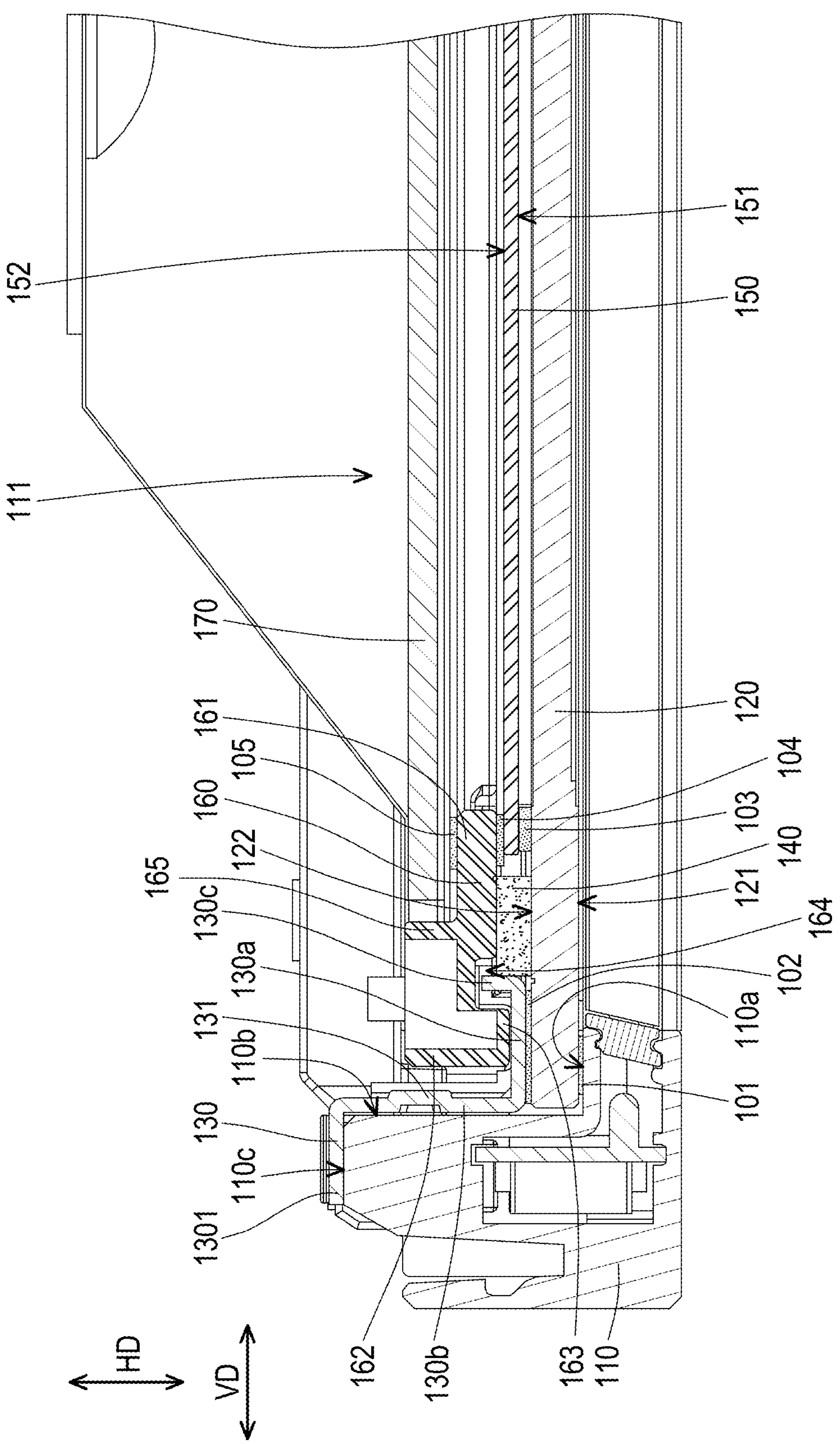

Next, please refer to FIG. 2F and FIG. 2G, the adhesive layer 105 is disposed on the second surface, which is opposite to the first surface, of the platform portion 161 of the frame 160. The backlight film 170 is then placed within the positioning space 111 in the vertical direction VD, so that the backlight film 170 is attached and fixed to the second surface of the platform portion 161 through the adhesive layer 105. For instance, the backlight film 170 may be a direct-type backlight film.

Figure 2H:
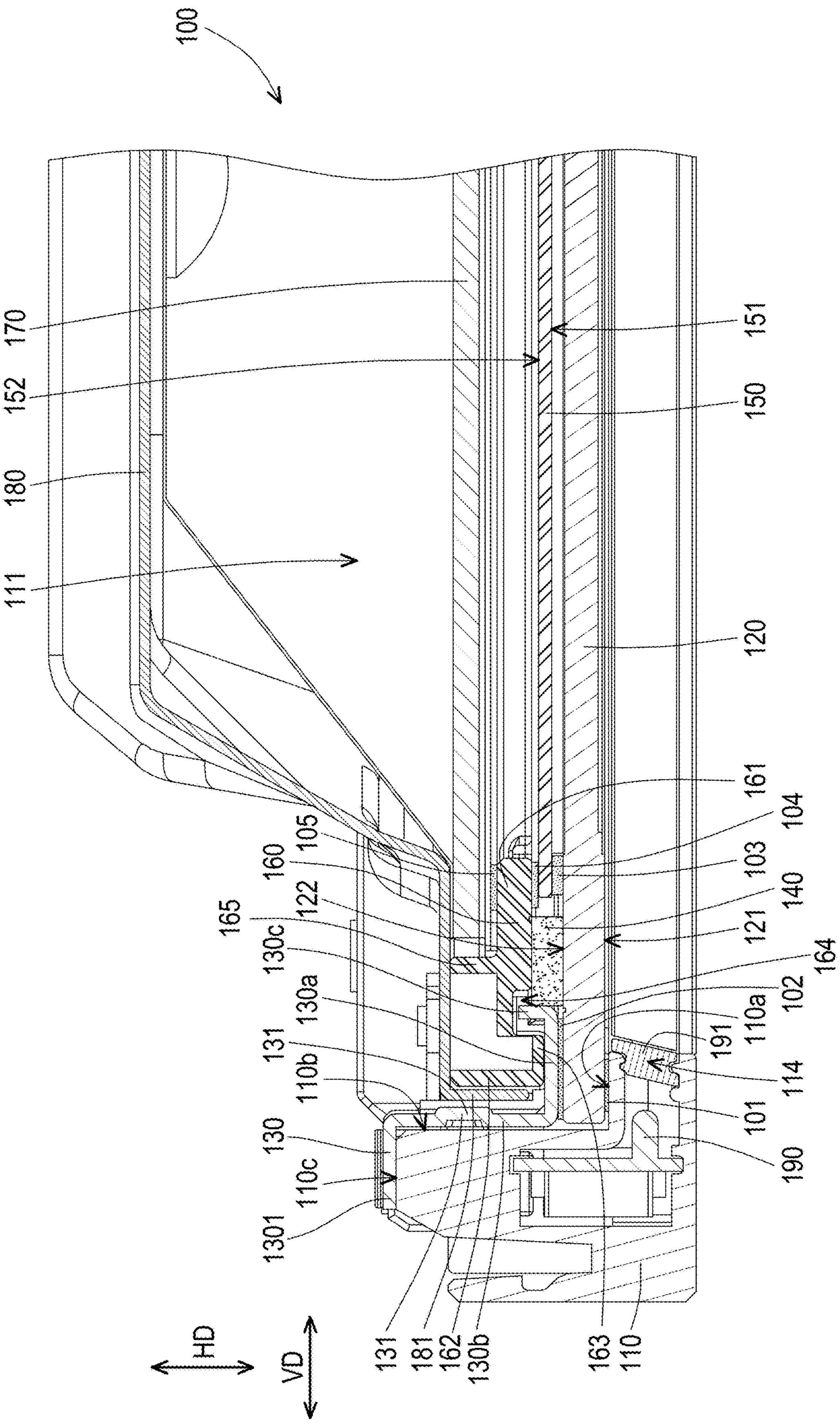

Next, please refer to FIG. 2G and FIG. 2H, the back plate 180 is placed with the positioning space 111 in the vertical direction VD, so that the back plate 180 covers the frame 160 and the backlight film 170 and leans against the end point of the frame inner sidewall 165 and the frame outer sidewall 162 of the frame 160. Furthermore, an assembly gap is left between the abutting portion 163 and the frame outer sidewall 162 of the frame 160 and the connecting portion 130b in the horizontal direction HD, so that the back plate sidewall 181 is inserted into this assembly gap in the vertical direction VD and positioned between the frame outer sidewall 162 of the frame 160 and the connecting portion 130b.

After the back plate sidewall 181 is inserted into the aforementioned assembly gap, a gap is still left between the back plate sidewall 181 and the connecting portion 130b in the horizontal direction HD. The positioning protrusion 131 protrudes from the connecting portion 130b in the horizontal direction HD toward the frame outer sidewall 162 of the frame 160, and the back plate sidewall 181 does not contact the positioning protrusion 131, so that the gap is therebetween. At this point, the periphery of the main body of the back plate 180 leans against the end point of the frame inner sidewall 165 and the frame outer sidewall 162 of the frame 160 in the vertical direction VD and presses against the periphery of the backlight film 170, without collision or interference that could damage the backlight film 170.

Finally, please refer to FIG. 1C and FIG. 2H, a back plate positioning member 200 is locked and fixed to the outer frame 110 by a screw, so that the back plate positioning member 200 presses against the periphery of the main body of the back plate 180 to fix the back plate 180 to the outer frame 110 and the frame 160. At this point, the assembly of the backlight module of the display device 100 is completed, and then a circuit board and a back housing may be assembled onto the main body of the back plate 180 in the vertical direction VD without flipping and reversing the display device 100.

Please refer to FIG. 1D and FIG. 2H, in one embodiment, the display device 100 further includes an optical touch module 190 and a filter plate 191. The optical touch module 190 is disposed in an installation chamber 113 of the front cover 110, and the installation chamber 113 has an opening 114 adjacent to the first positioning surface 110a and the touch surface 121 of the cover panel 120. The optical touch module 190 may be, for example, an infrared touch module, and at least includes an infrared transmitter and an infrared receiver.

On the other hand, the filter plate 191 is installed in the opening 114 and may be an infrared filter. Specifically, the light to be sensed, which is emitted by the infrared transmitter, may transmit through the opening 114 and pass through the touch surface 121 of the cover panel 120. Correspondingly, the light to be sensed may transmit into the installation chamber 113 through the opening 114 to be received by the infrared receiver.

Figure 3:
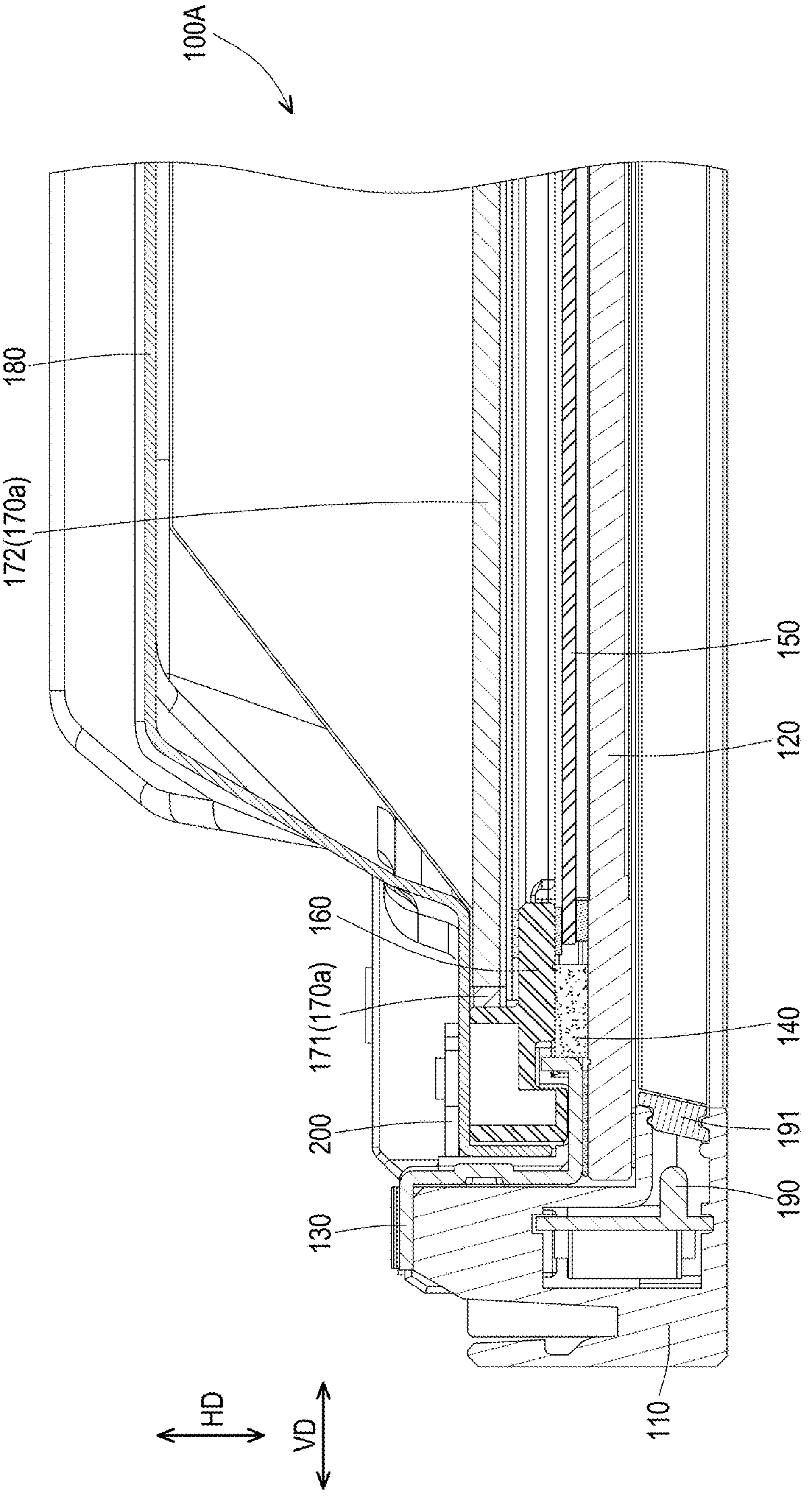
FIG. 3 is a partial cross-sectional schematic view of a display device according to another embodiment of the disclosure.

FIG. 3 is a partial cross-sectional schematic view of a display device according to another embodiment of the disclosure. Please refer to FIG. 3, different from the display device 100 shown in FIG. 2G and FIG. 2H, a backlight film 170a of a display device 100A of this embodiment is an edge-lit backlight film. For instance, a light source 171 is disposed on a side of a light guide plate 172, whereas the light source shown in FIG. 2G and FIG. 2H is pre-installed with the back plate 180.

In summary, the display device and the assembling method of the present disclosure provide the buffering member separating the panel edges of the display panel from the positioning members. The panel edges of the display panel are oriented toward the buffering members in the horizontal direction, and the panel edges are close to but not in contact with the buffering members. Therefore, during transportation of the display device or flipping the display device, the buffering members can not only not only prevent the display panel from excessively sliding but also protect the display panel from colliding with the positioning members or other adjacent structures, so that the product reliability can be improved. On the other hand, the positions of the buffering members on the cover panel may be accurately positioned by the positioning members. The display panel may be accurately attached and fixed onto the cover panel according to the installation region defined by the buffering members and the positioning members, and the positioning members may improve the efficiency, accuracy, and reliability of installing and positioning the frame and the back plate during assembly.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a front cover, wherein a positioning space is formed inside the front cover;

a plurality of positioning members, wherein each of the plurality of positioning members comprises a positioning portion and a connecting portion which are disposed in the positioning space;

a plurality of buffering members disposed at positions in the positioning space contacting the positioning portions of the plurality of positioning members;

a display panel disposed in the positioning space, wherein the plurality of buffering members are located between the display panel and the positioning portions, and a panel edge of the display panel is close to but not in contact with the plurality of buffering members;

a frame disposed in the positioning space, fixed to the display panel, and comprising a platform portion and an abutting portion, wherein a first surface of the platform portion is fixed to the plurality of buffering members and the display panel, and the abutting portion contacts the positioning portion of each of the plurality of positioning members;

a backlight film attached and fixed to a second surface of the platform portion, wherein the second surface is opposite to the first surface; and a back plate leaning against the backlight film and an end point of a sidewall of the frame.

2. The display device according to claim 1, further comprising:

a cover panel fixed to a first positioning surface of the front cover, wherein an edge of the cover panel is close to but not in contact with a second positioning surface of the front cover, and the first positioning surface and the second positioning surface define the positioning space.

3. The display device according to claim 1, wherein a back plate sidewall of the back plate is disposed between the sidewall of the frame and the connecting portion, and a gap is provided between the back plate sidewall and the connecting portion.

4. The display device according to claim 3, wherein the connecting portion further comprises a positioning protrusion, the positioning protrusion protrudes toward the sidewall of the frame, and the gap is provided between the back plate sidewall of the back plate and the positioning protrusion of the connecting portion.

5. The display device according to claim 1, wherein the frame further comprises a positioning groove formed between the platform portion and the abutting portion, and the abutting portion is aligned to a back surface on the positioning portion of each of the plurality of positioning members.

6. The display device according to claim 5, wherein the positioning portion of each of the plurality of positioning members is bent to form a positioning sidewall, and the positioning groove of the frame is aligned with the positioning sidewall.

7. The display device according to claim 2, further comprising:

an optical touch module disposed in an installation chamber of the front cover, wherein the installation chamber has an opening adjacent to the first positioning surface; and a filter plate installed in the opening.

8. A display device, comprising:

a front cover;

a positioning member fixed to the front cover;

a buffering member in contact with the positioning member;

a display panel, wherein a panel edge of the display panel is close to but not in contact with the buffering member;

a frame attached and fixed to the display panel and in contact with the buffering member and the positioning member;

a backlight film attached and fixed to the frame; and a back plate fixed to the frame and leaning against the backlight film, wherein a back plate sidewall of the back plate is positioned between the frame and the positioning member.

9. The display device according to claim 8, further comprising:

a cover panel fixed to the front cover, wherein a gap is provided in a horizontal direction between an edge of the cover panel and the front cover.

10. The display device according to claim 8, wherein a gap is provided in a horizontal direction between the back plate sidewall of the back plate and the positioning member.

11. The display device according to claim 10, wherein the positioning member comprises a positioning protrusion protruding toward the frame, and a gap is provided in the horizontal direction between the back plate sidewall of the back plate and the positioning protrusion.

12. The display device according to claim 8, wherein a positioning space is formed inside the front cover, the cover panel fixed to a first positioning surface of the front cover, the edge of the cover panel is close to but not in contact with a second positioning surface of the front cover, and the first positioning surface and the second positioning surface define the positioning space.

13. The display device according to claim 12, further comprising:

an optical touch module disposed in an installation chamber of the front cover, wherein the installation chamber has an opening adjacent to the first positioning surface; and a filter plate installed in the opening.

14. The display device according to claim 8, wherein the frame comprises a platform portion, an abutting portion, and a positioning groove formed between the platform portion and the abutting portion, wherein the abutting portion is aligned to a back surface of the positioning member.

15. The display device according to claim 14, wherein the positioning member comprises a positioning sidewall, and the positioning groove of the frame is aligned with the positioning sidewall.

16. An assembling method of a display device comprising a front cover, a display panel, and a back plate, the assembling method comprising:

placing the front cover in a vertical direction, wherein a positioning space is formed inside the front cover;

arranging a plurality of positioning members, wherein each of the plurality of positioning members comprises a positioning portion and a connecting portion which are disposed in the positioning space;

arranging a plurality of buffering members, wherein the plurality of buffering members are disposed at positions in the positioning space contacting the positioning portions of the plurality of positioning members;

arranging the display panel in the positioning space, wherein a panel edge of the display panel is close to but not in contact with the plurality of buffering members, and the plurality of buffering members are located between the display panel and the positioning portions;

arranging a frame in the positioning space and fixing the frame to the display panel, wherein the frame comprises a platform portion and an abutting portion, a first surface of the platform portion is fixed to the plurality of buffering members and the display panel, and the abutting portion contacts the positioning portion of each of the plurality of positioning members;

arranging a backlight film on a second surface of the platform portion, wherein the second surface is opposite to the first surface; and arranging the back plate to lean against the backlight film and an end point of a sidewall of the frame.

17. The assembling method of the display device according to claim 16, further comprising:

disposing and fixing a cover panel on a first positioning surface of the front cover, wherein an edge of the cover panel is close to but not in contact with a second positioning surface of the front cover, and the first positioning surface and the second positioning surface define the positioning space.

18. The assembling method of the display device according to claim 16, wherein the step of arranging the back plate to lean against the backlight film and the end point of the sidewall of the frame further comprises:

disposing a back plate sidewall of the back plate between the sidewall of the frame and the connecting portion and leaving a gap between the back plate sidewall and the connecting portion.

19. The assembling method of the display device according to claim 18, wherein the connecting portion further comprises a positioning protrusion, and the gap is left between the back plate sidewall of the back plate and the positioning protrusion of the connecting portion.

20. The assembling method of the display device according to claim 17, further comprising:

disposing an optical touch module in an installation chamber of the front cover, wherein the installation chamber has an opening adjacent to the first positioning surface; and installing a filter plate in the opening of the installation chamber.

* * * * *